United States Patent
Stein et al.

(10) Patent No.: US 6,770,693 B2
(45) Date of Patent: Aug. 3, 2004

(54) BLENDS OF PHOSPHITES AND ANTIOXIDANTS

(75) Inventors: Daryl Stein, West Chester, OH (US); Don R. Stevenson, Dover, OH (US); Satyan R. Kodali, Dover, OH (US); Marc Nolen, Dover, OH (US)

(73) Assignee: Dove Chemical Corporation, Dover, OH (US)

( * ) Notice: Subject to any disclaimer, the term of this patent is extended or adjusted under 35 U.S.C. 154(b) by 198 days.

(21) Appl. No.: 09/962,698

(22) Filed: Sep. 25, 2001

(65) Prior Publication Data

US 2002/0040081 A1 Apr. 4, 2002

Related U.S. Application Data

(63) Continuation of application No. 09/353,000, filed on Jul. 13, 1999, now abandoned.
(60) Provisional application No. 60/092,639, filed on Jul. 13, 1998.

(51) Int. Cl.[7] .......................... C08K 5/526; C08K 5/13
(52) U.S. Cl. ...................... 524/128; 524/147; 524/151; 252/400.24; 252/404
(58) Field of Search ................ 524/128, 147, 524/151; 252/400.24, 404

(56) References Cited

U.S. PATENT DOCUMENTS

| | | | |
|---|---|---|---|
| 3,219,622 A | 11/1965 | Luciani et al. | |
| 4,116,926 A | 9/1978 | York | |
| 4,187,212 A | 2/1980 | Zinke et al. | |
| 4,504,615 A | 3/1985 | Mills | |
| 4,824,885 A | 4/1989 | Magni et al. | |
| 5,023,285 A | 6/1991 | Horn | |
| 5,106,892 A | 4/1992 | Chiolle et al. | |
| 5,364,895 A | 11/1994 | Stevenson et al. | |
| 5,438,086 A | 8/1995 | Stevenson et al. | |
| 5,883,165 A | 3/1999 | Krohnke et al. | |
| 6,056,897 A * | 5/2000 | Pallini et al. | 252/399 |
| 6,156,845 A * | 12/2000 | Saito et al. | 525/240 |
| 6,197,886 B1 * | 3/2001 | Chatterjee et al. | 525/240 |

FOREIGN PATENT DOCUMENTS

WO  WO 00/23514  4/2000

* cited by examiner

Primary Examiner—Peter Szekely
(74) Attorney, Agent, or Firm—Buckingham, Doolittle and Burroughs, LLP; Louis F. Wagner

(57) ABSTRACT

This invention discloses blends of phosphites comprising bis-(2,4-dicumylphenyl) pentaerythritol diphosphite and hindered phenol antioxidants useful as stabilizers against thermooxidative degradation of polymers during melt processing. Polymer compositions comprising the blends show improved resistance to thermooxidative degradation during melt processing as measured by melt flow index and yellowness index.

22 Claims, No Drawings

BLENDS OF PHOSPHITES AND ANTIOXIDANTS

This application is a continuation of copending application Ser. No. 09/353,000 filed on Jul. 13, 1999 now abandoned.

The nonprovisional application designated above, namely application 09/353,000, filed Jul. 13, 1999, claims the benefit of U.S. Provisional Application No.: 60/092,639 filed on Jul. 13, 1998.

FIELD

This invention pertains generally to synergistic blends of phosphites and hindered phenols with or without other additives as stabilizers for polymers.

BACKGROUND

The invention described herein pertains generally to synergistic blends of certain phosphites and hindered phenols as stabilizers for polymers. These blends may be used with other polymer additives.

Various prior art references teach the incorporation of additives into organic polymeric materials. These additives can include polymer stabilizers such as antioxidants, UV absorbers and light stabilizers, metal deactivators, peroxide scavengers, basic co-stabilizers, lactones, nucleating agents, fillers and reinforcing agents, aminoxy propanoate derivatives, plasticizers, lubricants, emulsifiers, pigments and dyes, optical brightners, flame-proofing agents, antistatic agents, blowing agents, cross-linking agents, antiblocking agents, slip agents, processing aids, and thiosynergists.

In particular, certain phosphites have been used in combination with hindered phenols as additives in polymers for stabilization against thermooxidative deterioration.

What is illustrated in this invention are novel blends of phosphites and hindered phenols useful as polymer additives. The novel blends of phosphites and hindered phenols of this invention show superior performance in stabilizing polymers against thermooxidative deterioration as compared with prior art phosphite/hindered phenol blends.

SUMMARY

In accordance with the present invention, there is provided a composition useful as a polymer additive comprising a blend of bis-(2,4-dicumylphenyl) pentaerythritol diphosphite, optionally, one or more additional phosphites, and one or more hindered phenols. As compared with prior art phosphite/hindered phenol blends, the blends of this invention show unexpectedly superior performance in stabilizing polymers against thermooxidative deterioration during processing as indicated by melt flow index.

It is therefore an object of this invention to provide blends of phosphites and hindered phenols comprising bis-(2,4-dicumylphenyl) pentaerythritol diphosphite, said blends being useful, when added to polymers, as stabilizers against thermooxidative degradation during processing of a polymer composition comprising the polymer and the blend.

In general, the present invention provides a composition which comprises bis-(2,4-dicumylphenyl) pentaerythritol diphosphite, optionally, at least one additional phosphite; and at least one hindered phenol antioxididant.

This and other objects of this invention will be evident when viewed in light of the drawings, detailed description, and appended claims.

DESCRIPTION

It has been discovered that blends of bis-(2,4-dicumylphenyl) pentaerythritol diphosphite (DOVERPHOS S-9228), optionally at least one additional phosphite, and at least one hindered phenol antioxidant provide better protection against polymer degradation during processing as evidenced by changes in melt flow and may provide better resistance to yellowing than do the current commercially available additive blends.

A non-limiting list of exemplary additional phosphites that may be used in this invention would include tris-(2,4-di-t-butylphenyl) phosphite (DOVERPHOS S-480), distearyl pentaerythritol diphosphite (DOVERPHOS S-680), trisnonylphenyl phosphite (DOVERPHOS 4), phenyl diisodecyl phosphite (DOVERPHOS 7), diphenyl isodecyl phosphite (DOVERPHOS 8), triphenyl phosphite (DOVERPHOS 10), trilauryl phosphite (DOVERPHOS 53), alkyl ($C_{12}$–$C_{15}$) bisphenol A phosphite (DOVERPHOS 613), alkyl ($C_{10}$) bisphenol A phosphite (DOVERPHOS 675), bis-(2,4-di-t-butylphenyl) pentaerythritol diphosphite (ULTRANOX 626), 2-butyl-2-ethyl-1,3-propanediol 2,4,6-tri-t-butylphenol phosphite (ULTRANOX 641), bis-(2,6-di-t-butyl-4-methylphenyl) pentaerythritol diphosphite (PEP 36), tetrakis-(2,4-di-t-butylphenyl) 4,4'-diphenylenediphosphonite (P-EPQ), 2,2'-ethylidene bis-(4,6-di-t-butylphenyl)fluorophosphonite (ETHANOX 398), bis-(2,4-di-t-butyl-6-methylphenyl) ethyl phosphite (IRGAFOS 38) and 2,2',2"-nitrilotriethanol tris[3,3',5,5'-tetra-tert-butyl-1,1'-biphenyl-2,2'-diyl)-phosphite (IRGAFOS 12).

Preferred additional phosphites that may be used in conjunction with bis-(2,4-dicumylphenyl) pentaerythritol diphosphite are tetrakis-(2,4-di-t-butylphenyl) 4,4'-diphenylenediphosphonite (P-EPQ) and tris-(2,4-di-t-butylphenyl) phosphite (DOVERPHOS S-480).

A non-limiting exemplary list of hindered phenolic antioxidants that may be used in this invention would include 2,6-di-t-butyl-4-methylphenol (BHT), 2,6-di-t-butyl-4-ethylphenol, tetrakis [methylene (3,5-di-t-butyl-4-hydroxyhydrocinnamate)]methane (DOVERNOX 10), octadecyl 3,5-di-t-butyl-4-hydroxyhydrocinnamate (DOVERNOX 76), tris (3,5-di-t-butyl-4-hydroxybenzyl)-1,3,5-triazine-2,4,6(1H3H, 5H)-trione (DOVERNOX 3114), and -tocopherol (Vitamin E).

Preferred hindered phenolic antioxidants are BHT, tetrakis [methylene (3,5-di-t-butyl-4-hydroxyhydrocinnamate)] methane, octadecyl 3,5-di-t-butyl-4-hydroxyhydrocinnamate, tris (3,5-di-t-butyl-4-hydroxybenzyl)-1,3,5-triazine-2,4,6(1H, 3H, 5H)-trione, and Vitamin E.

For blends of phosphites and hindered phenol antioxidants, the hindered phenol antioxidant is added in a synergistic amount, and the weight ratio of phosphite: hindered phenol antioxidant may be between about 100:1 to about 1:100. A preferred range is from about 20:1 to about 1:10. Two or more phosphites and two or more hindered phenol antioxidants may be blended together in order to make the phosphite/hindered phenol antioxidant blend.

For blends comprising bis-(2,4-dicumylphenyl) pentaerythritol diphosphite, additional phosphites, and hindered phenol antioxidants, the weight ratio of of bis-(2,4-dicumylphenyl) pentaerythritol diphosphite to additional phosphites may be any ratio between about 10:1 to about 1:10. A preferred range is from about 4:1 to about 1:4.

Blends of phosphites and more than one hindered phenol may be used. For example, BHT and tetrakis [methylene (3,5-di-t-butyl-4-hydroxyhydrocinnamate)]methane may be used in a weight ratio of about 1:1. Other examples of such mixtures are possible, and the weight ratio may be between about 10:1 and about 1:10.

Preferred phosphite/hindered phenol antioxidant blends are blends of bis-(2,4-dicumylphenyl) pentaerythritol diphosphite with tetrakis [methylene (3,5-di-t-butyl-4-hydroxyhydrocinnamate)] methane.

A non-limiting exemplary list of the polymers in which the blends may be used would include polyolefins, PET (polyethylene terephthalate), PBT (polybutylene terephthalate), polystyrene, polyacrylics, polycarbonates, PVC (polyvinyl chloride), EPDM (ethylene propylene diene monomer), SAN (styrene acrylonitrile), PPO (polyphenylene oxide), SBR (styrene butadiene rubbers), ABS (acrylonitrile butadiene styrene), and nylons. The phosphite/hindered phenol antioxidant blend may be used in any concentration from about 10 ppm to about 10,000 ppm based on the total weight of the polymer and the additives, and the blends may be compounded into the polymers by methods known in the art.

EXAMPLES

The best mode for carrying out the invention will now be described for the purposes of illustrating the best mode known to the applicant at the time. The examples are illustrative only and not meant to limit the invention, as measured by the scope and spirit of the claims.

Example 1

This example compares blends of bis-(2,4-dicumylphenyl) pentaerythritol diphosphite with a hindered phenol antioxidant.

The blend comprised bis-(2,4-dicumylphenyl) pentaerythritol diphosphite, and a hindered phenol antioxidant. The ingredients were thoroughly mixed to form the desired well-mixed blend.

The hindered phenol used was tetrakis [methylene (3,5-di-t-butyl-4-hydroxyhydrocinnamate)] methane:

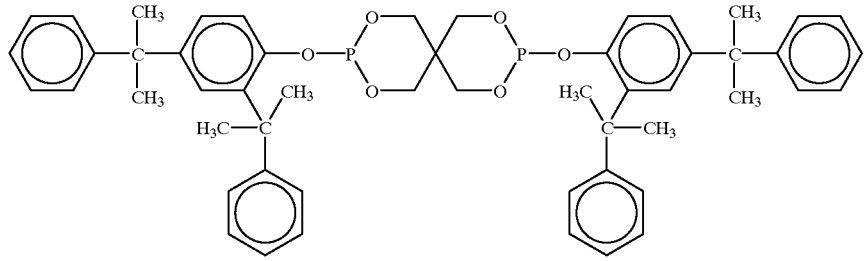

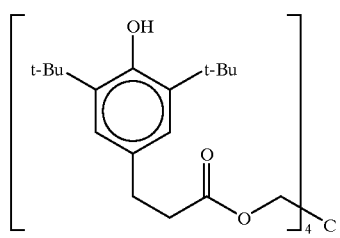

The following blends were prepared:

Blend 1,
  bis-(2,4-dicumylphenyl)pentaerythritol diphosphite (2 parts) tetrakis [methylene (3,5-di-t-butyl-4-hydroxyhydrocinnamate)] methane (1 part)

Blend 2,
  bis-(2,4-dicumylphenyl)pentaerythritol diphosphite (1 part) tetrakis [methylene (3,5-di-t-butyl-4-hydroxyhydrocinnamate)] methane (1 part)

These blends were then added to Profax 6501 polypropylene at 1000 ppm along with 500 ppm of calcium stearate and mixed to form a well-mixed polymer composition. The polymer composition was then subjected to multiple pass extrusion at 280° C. and 60 rpm using a Brabender PL 2000 single screw laboratory extruder. The melt flow (ASTM 1238) was measured after the first and fifth passes with a Tinius Olsen extrusion plastometer. For comparison, two commercially available blends were also each mixed with polypropylene at 1000 ppm along with 500 ppm of calcium stearate, and the resulting polymer compositions were subjected to multiple pass extrusion at 280C. and 60 rpm.

The commercially available blends were Irganox B 215 FF, a 2:1 blend of tris-(2,4-di-t-butylphenyl) phosphite and tetrakis[methylene (3,5-di-t-butyl-4-hydroxyhydrocinnamate)] methane, and Irganox B 225 FF, a 1:1 blend of tris-(2,4-di-t-butylphenyl) phosphite and tetrakis[methylene (3,5-di-t-butyl-4-hydroxyhydrocinnamate)] methane. The results are given in Table 1.

TABLE 1

| Blend | Melt Flow (g/10 min) | | Yellowness Index | |
|---|---|---|---|---|
|  | 1-Pass | 5-Pass | 1-Pass | 5-Pass |
| This Invention: | | | | |
| Blend 1 | 4.0 | 7.0 | 4.1 | 9.2 |
| Blend 2 | 4.4 | 7.4 | 4.1 | 9.3 |
| Comparative Examples | | | | |
| Irganox B 215 FF | 6.0 | 11.0 | 3.6 | 8.6 |
| Irganox B 225 FF | 6.2 | 11.8 | 3.7 | 10.5 |

As can be seen in Table 1, both blend 1 and blend 2 provide a lower initial and final melt flow than do either of the commercially available blends. An increase in melt flow is indicative of polymer degradation. Therefore, blends 1 and 2 provide better protection against degradation that do the commercial blends.

Example 2

This example compares blends of bis-(2,4-dicumylphenyl) pentaerythritol diphosphite, a hindered phenol antioxidant, and a lactone with other blends.

The following blends were prepared:

Blend 3
   40 wt % bis-(2,4-dicumylphenyl) pentaerythritol diphosphite
   50 wt % tetrakis[methylene (3,5-di-t-butyl-4-hydroxyhydrocinnamate)] methane
   10 wt % 5,7-di-t-butyl-3-phenylbenzofuran-2-one Blend 4
   40 wt % bis-(2,4-di-t-butylphenyl) pentaerythritol diphosphite
   50 wt % tetrakis[methylene (3,5-di-t-butyl-4-hydroxyhydrocinnamate)]methane
   10 wt % 5,7-di-t-butyl-3-phenylbenzofuran-2-one Blend 5
   40 wt % tris (2,4-di-t-butylphenyl) phosphite
   50 wt % tetrakis[methylene (3,5-di-t-butyl-4-hydroxyhydrocinnamate)]methane
   10 wt % 5,7-di-t-butyl-3-phenylbenzofuran-2-one Blends 3, 4, and 5 were processed following the procedure of Example 1. The results are shown in Table 2.

TABLE 2

| Blend | Melt Flow (g/10 min) | |
| --- | --- | --- |
|  | 1-Pass | 5-Pass |
| Blend 3 | 3.4 | 3.8 |
| Blend 4 | 3.0 | 6.0 |
| Blend 5 | 3.8 | 5.0 |

The results of Table 2 indicate superior 5-pass melt flow stability of Blend 3, which comprises bis-(2,4-dicumylphenyl) pentaerythritol diphosphite, as compared with the other blends.

Example 3

This example compares the effect in polypropylene of blends of bis-(2,4-dicumylphenyl) pentaerythritol disphosphite and a hindered phenol antioxidant, with and without an additional second phosphite. The following blends were prepared:

Blend 3A
   50% tetrakis [methylene(3,5-di-t-butyl-4-hydroxyhydrocinnamate)]methane
   50% bis-(2,4-dicumylphenyl) pentaerythritol disphosphite Blend 3B
   50% tetrakis [methylene(3,5-di-t-butyl-4-hydroxyhydrocinnamate)]methane
   25% bis-(2,4-dicumylphenyl) pentaerythritol disphosphite
   25% tris-(2,4-di-t-butylphenyl) phosphite Blend 3C
   50% tetrakis [methylene(3,5-di-t-butyl-4-hydroxyhydrocinnamate)]methane
   50% bis (2,4-di-t-butylphenyl) pentaerythritol disphosphite Blend 3D
   50% tetrakis [methylene(3,5-di-t-butyl-4-hydroxyhydrocinnamate)]methane
   25% bis-(2,4-dicumylphenyl) pentaerythritol disphosphite
   25% bis (2,4-di-t-butylphenyl) pentaerythritol disphosphite Blend 3E
   50% tetrakis [methylene(3,5-di-t-butyl-4-hydroxyhydrocinnamate)]methane
   50% 2-butyl -2-ethyl-1,3-propanediol 2,4,6-tri-t-butylphenol phosphite Blend 3F
   50% tetrakis [methylene(3,5-di-t-butyl-4-hydroxyhydrocinnamate)]methane
   25% bis-(2,4-dicumylphenyl) pentaerythritol disphosphite
   25% 2-butyl -2-ethyl-1,3-propanediol 2,4,6-tri-t-butylphenol phosphite B1: Blend 1 from Example 1

B2: Blend 2 from Example 1

Blends 3A–3F were processed following the procedure of Example 1. The results are shown in Tables 3, 4, and 5. In Tables 3, 4, and 5, the % of Total Phosphite is the weight percent of each added phosphite in the total amount of added phosphite. Yellowness index was measured using a Hunter Lab model D25 calorimeter.

TABLE 3 bis-(2,4-dicumylphenyl) pentaerythritol disphosphite (S9228)
bis (2,4-di-t-butylphenyl) pentaerythritol diphosphite (U626)
polypropylene

| | % of Total Phosphite | | Melt Flow Index, g/10 min | | | Yellowness Index | | |
| --- | --- | --- | --- | --- | --- | --- | --- | --- |
| Exp | S9228 | U626 | 1 Pass | 3 Passes | 5 Passes | 1 Pass | 3 Passes | 5 Passes |
| B2 | 100 | 0 | 4.4 | — | 7.4 | 4.1 | — | 9.3 |
| 3D | 50 | 50 | 3.9 | 4.1 | 5.1 | 3.6 | 5.1 | 5.6 |
| 3C | 0 | 100 | 4.0 | 5.4 | 6.1 | 3.7 | 5.1 | 5.7 |

TABLE 4 bis-(2,4-dicumylphenyl) pentaerythritol disphosphite (S9228)
tris-(2,4-di-t-butylphenyl) phosphite (S480)
polypropylene

| | % of Total Phosphite | | Melt Flow Index, g/10 min | | | Yellowness Index | | |
|---|---|---|---|---|---|---|---|---|
| Exp | S9228 | U480 | 1 Pass | 3 Passes | 5 Passes | 1 Pass | 3 Passes | 5 Passes |
| B2 | 100 | 0 | 4.4 | — | 7.4 | 4.1 | — | 9.3 |
| 3B | 50 | 50 | 4.7 | 7.4 | 9.5 | 3.8 | 4.5 | 5.5 |
| 3A | 0 | 100 | 6.1 | 9.1 | 13.1 | 4.0 | 5.3 | 6.7 |

TABLE 5 bis-(2,4-dicumylphenyl) pentaerythritol disphosphite (S9228)
2-butyl-2-ethyl-1,3-propanediol 2,4,6-tri-t-butylphenol phosphite (U641)
polypropylene

| | % of Total Phosphite | | Melt Flow Index, g/10 min | | | Yellowness Index | | |
|---|---|---|---|---|---|---|---|---|
| Exp | S9228 | U641 | 1 Pass | 3 Passes | 5 Passes | 1 Pass | 3 Passes | 5 Passes |
| B2 | 100 | 0 | 4.4 | — | 7.4 | 4.1 | — | 9.3 |
| 3F | 50 | 50 | 3.8 | 4.4 | 6.4 | 4.0 | 4.4 | 5.6 |
| 3E | 0 | 100 | 4.1 | 6.0 | 7.0 | 4.2 | 5.5 | 7.9 |

As can be seen in Tables 3, 4, and 5, the blends of bis-(2,4-dicumylphenyl) pentaerythritol disphosphite and a second phosphite in polypropylene show unexpectedly superior performance as compared with either phosphite alone in polypropylene, as measured by melt flow index and yellowness index. A lower melt flow index and a lower yellowness index are both indicative of superior inhibition of polymer degradation.

Example 4

This example compares the effect in polyethylene (linear low densitty polyethylene) of blends of bis-(2,4-dicumylphenyl) pentaerythritol disphosphite and a hindered phenol antioxidant, with and without an additional second phosphite. The following blends were prepared using tetrakis [methylene(3,5-di-t-butyl-4-hydroxhydrocinnamate)] methane (Dovernox 10); bis-(2,4-dicumylphenyl) pentaerythritol disphosphite (Doverphos S 9228T); bis (2,4-di-t-butylphenyl) pentaerythritol diphosphite (Ultranox 626); and tris-(2,4-di-t-butylphenyl) phosphite (Irgafos 168). The composition of the blends is shown in Table 6.

These blends were mixed with Eastman LLDPE to give compositions with 500 parts total phosphite, 500 parts hindered phenol, and 500 parts calcium stearate. The compositions were subjected to multipass extrusion at 260 C. as in Example 1. Melt flow index was measured at 190 C. and 21.6 kg. Yellowness index was measured using a Hunter Lab model D25 calorimeter. The results are shown in Tables 7 and 8.

TABLE 7 bis-(2,4-dicumylphenyl) pentaerythritol disphosphite (S9228)
bis (2,4-di-t-butylphenyl) pentaerythritol diphosphite (U626)
polyethylene (Eastman LLDPE)

| | % of Total Phosphite | | Melt Flow Index, g/10 min | | | Yellowness Index | | |
|---|---|---|---|---|---|---|---|---|
| Exp | S9228 | U626 | 1 Pass | 3 Passes | 5 Passes | 1 Pass | 3 Passes | 5 Passes |
| 4B | 100 | 0 | 18.6 | 17.1 | 16.4 | -1.1 | 1.3 | 2.4 |
| 4I | 90 | 10 | 18.6 | 17.4 | 16.7 | -1.7 | -0.9 | 0.4 |
| 4M | 66.6 | 33.3 | 18.6 | 17.1 | 16.7 | -0.9 | -0.4 | 0.9 |
| 4E | 50 | 50 | 18.6 | 17.4 | 16.2 | -1.7 | 0.5 | 0.9 |
| 4K | 33.3 | 66.6 | 18.8 | 18.7 | 17.0 | -1.5 | 1.0 | 2.6 |
| 4G | 10 | 90 | 18.9 | 17.3 | 17.0 | -1.7 | -0.6 | 2.4 |
| 4C | 0 | 100 | 18.6 | 17.7 | 16.5 | -1.6 | -0.1 | 3.0 |

TABLE 8 bis-(2,4-dicumylphenyl) pentaerythritol disphosphite (S9228)
tris-(2,4-di-t-butylphenyl) phosphite (I168)
polyethylene (Eastman LLDPE)

| | % of Total Phosphite | | Melt Flow Index, g/10 min | | | Yellowness Index | | |
|---|---|---|---|---|---|---|---|---|
| Exp | S9228 | I168 | 1 Pass | 3 Passes | 5 Passes | 1 Pass | 3 Passes | 5 Passes |
| 4B | 100 | 0 | 18.6 | 17.1 | 16.4 | -1.1 | 1.3 | 2.4 |
| 4J | 90 | 10 | 18.3 | 17.8 | 16.4 | -1.3 | -0.1 | 1.2 |
| 4N | 66.6 | 33.3 | 18.3 | 17.1 | 16.5 | -0.9 | 0.2 | 3.7 |
| 4F | 50 | 50 | 18.0 | 18.3 | 16.4 | -2.0 | 0.1 | 2.2 |
| 4L | 33.3 | 66.6 | 18.3 | 17.3 | 16.2 | -1.5 | 0.4 | 2.5 |
| 4H | 10 | 90 | 18.1 | 17.0 | 16.8 | -0.2 | 2.1 | 7.5 |
| 4D | 0 | 100 | 17.7 | 16.8 | 16.7 | 0.0 | 3.0 | 5.7 |

TABLE 6

| Material(ppm) | 4B | 4C | 4D | 4E | 4F | 4G | 4H | 4I | 4J | 4K | 4L | 4M | 4N |
|---|---|---|---|---|---|---|---|---|---|---|---|---|---|
| CaSt 5899 | 500 | 500 | 500 | 500 | 500 | 500 | 500 | 500 | 500 | 500 | 500 | 500 | 500 |
| Dovernox 10 | 250 | 250 | 250 | 250 | 250 | 250 | 250 | 250 | 250 | 250 | 250 | 250 | 250 |
| Doverphos S 9228T | 250 | | | 125 | 125 | 25 | 25 | 225 | 225 | 83 | 83 | 167 | 167 |
| Ultranox 626 | | 250 | | 125 | | 225 | | 25 | | 167 | | 83 | |
| Irgafos 168 | | | 250 | | 125 | | 225 | | 25 | | 167 | | 83 |

As can be seen in Tables 7 and 8, the blends of bis-(2,4-dicumylphenyl) pentaerythritol disphosphite and a second phosphite in polyethylene show unexpectedly superior performance as compared with either phosphite alone in polyethylene, as measured by melt flow index and yellowness index. A lower melt flow index and a lower yellowness index are both indicative of superior inhibition of polymer degradation.

Example 5

This example compares the effect in polyethylene (Equistar HDPE Reactive Powder LR732) of blends of bis-(2,4-dicumylphenyl) pentaerythritol disphosphite and a hindered phenol antioxidant. The following blends were prepared using D 921, a blend of 2 parts bis-(2,4-dicumylphenyl) pentaerythritol disphosphite and 1 part tetrakis [methylene(3,5-di-t-butyl-4-hydroxhydrocinnamate)] methane; D 911, a blend of 1 part bis-(2,4-dicumylphenyl) pentaerythritol disphosphite and 1 part tetrakis [methylene (3,5-di-t-butyl-4-hydroxhydrocinnamate)]methane; B 215, a blend of 2 parts tris-(2,4-di-t-butylphenyl) phosphite and 1 part tetrakis [methylene (3,5-di t-butyl-4-hydroxhydrocinnamate)]methane; and B 225, a blend of 1 part tris-(2,4-di-t-butylphenyl) phosphite and 1 part tetrakis [methylene(3,5-di-t-butyl-4-hydroxhydrocinnamate)] methane. The composition of the blends is shown in Table 9.

TABLE 9

| Material(ppm) | 5A | 5B | 5C | 5D | 5E | 5F | 5G | 5H | 5I | 5J |
|---|---|---|---|---|---|---|---|---|---|---|
| Calcium stearate | 500 | 500 | 500 | 500 | 500 | 500 | 500 | 500 | 500 | 500 |
| Dovernox 10 | 500 | | | | | 1000 | | | | |
| D 921 | | 500 | | | | | 1000 | | | |
| D 911 | | | 500 | | | | | 1000 | | |
| B 215 | | | | 500 | | | | | 1000 | |
| B 225 | | | | | 500 | | | | | 1000 |

These blends were mixed with Equistar HDPE Reactive Powder LR732 to give compositions with 500 or 1000 parts phosphite, 500 parts hindered phenol, and 500 parts calcium stearate. The compositions were subjected to multipass extrusion at 260 C. as in Example 1. Melt flow index was measured at 190 C. and 21.6 kg. Yellowness index was measured using a Hunter Lab model D25 colorimeter. The results are shown in Table 10.

TABLE 10

Effect of Phosphite/Phenol Blends
High Density Polyethylene (HDPE)

| | Phenol (parts) | Phosphite (parts) | | Melt Flow Index, g/10 min | | | Yellowness Index | | |
|---|---|---|---|---|---|---|---|---|---|
| Exp | D 10 | S9228 | U626 | 1 Pass | 3 Passes | 5 Passes | 1 Pass | 3 Passes | 5 Passes |
| 5A | 500 | — | — | 35.2 | 36.6 | 34.5 | −0.3 | 3.5 | 5.8 |
| 5B | 167 | 333 | — | 32.1 | 33.6 | 32.1 | −2.1 | −0.9 | −0.2 |
| 5C | 250 | 250 | — | 32.1 | 34.2 | 32.7 | −2.4 | −1.6 | −0.8 |
| 5D | 167 | — | 333 | 33 | 36.3 | 31.5 | −2 | −0.5 | 0.4 |
| 5E | 250 | — | 250 | 36 | 33.9 | 32.1 | −1 | 0.7 | 1.1 |
| 5F | 1000 | — | — | 34.5 | 38.7 | 39.3 | −0.8 | 1.9 | 4.3 |
| 5G | 333 | 667 | — | 31.5 | 36 | 33.9 | −2.1 | −1.3 | −0.4 |
| 5H | 500 | 500 | — | 36.9 | 38.4 | 36.3 | −1.3 | 0 | 1 |
| 5I | 333 | — | 667 | 35.7 | 36 | 33.3 | −0.7 | 2.2 | 3.1 |
| 5J | 500 | — | 500 | 36 | 37.2 | 38.1 | −0.5 | 2 | 3.6 |

Example 6

This example compares the effect in polyethylene (Eastman LLDPE) of blends of bis-(2,4-dicumylphenyl) pentaerythritol disphosphite and a hindered phenol antioxidant. The following blends were prepared using D 921, a blend of 2 parts bis-(2,4-dicumylphenyl) pentaerythritol disphosphite and 1 part tetrakis [methylene(3,5-di-t-butyl-4-hydroxhydrocinnamate)]methane; D 911, a blend of 1 part bis-(2,4-dicumylphenyl) pentaerythritol disphosphite and 1 part tetrakis [methylene(3,5-di-t-butyl-4-hydroxhydrocinnamate)]methane; B 215, a blend of 2 parts tris-(2,4-di-t-butylphenyl) phosphite and 1 part tetrakis

[methylene(3,5-di-t-butyl-4-hydroxhydrocinnamate)] methane; and B 225, a blend of 1 part tris-(2,4-di-t-butylphenyl) phosphite and 1 part tetrakis [methylene(3,5-di-t-butyl-4-hydroxhydrocinnamate)]methane. The composition of the blends is shown in Table 11.

TABLE 11

| Material(ppm) | 6A | 6B | 6C | 6D | 6E | 6F | 6G | 6H | 6I | 6J | 6K |
|---|---|---|---|---|---|---|---|---|---|---|---|
| Calcium stearate | 500 | 500 | 500 | 500 | 500 | 500 | 500 | 500 | 500 | 500 | 500 |
| Dovernox 10 | 500 | | | | | 1000 | | | | | |
| D 921 | | 500 | | | | | 1000 | | | | |
| D 911 | | | 500 | | | | | 1000 | | | |
| B 215 | | | | 500 | | | | | 1000 | | |
| B 225 | | | | | 500 | | | | | 1000 | |

These blends were mixed with Eastman LLDPE to give compositions with 500 or 1000 parts phosphite, 500 parts hindered phenol, and 500 parts calcium stearate. The compositions were subjected to multipass extrusion at 260 C. as in Example 1. Melt flow index was measured at 190 C. and 21.6 kg. Yellowness index was measured using a Hunter Lab model D25 calorimeter. The results are shown in Table 12.

TABLE 12

Effect of Phosphite/Phenol Blends
Linear Low Density Polypropylene (LLDPE)

| | Phenol (parts) | Phosphite (parts) | | Melt Flow Index, g/10 min | | | Yellowness Index | | |
|---|---|---|---|---|---|---|---|---|---|
| Exp | D 10 | S9228 | U626 | 1 Pass | 3 Passes | 5 Passes | 1 Pass | 3 Passes | 5 Passes |
| 6A | 500 | — | — | 19.1 | 18.6 | 17.7 | 7.1 | 11.4 | 13.9 |
| 6B | 167 | 333 | — | 19.1 | 18.2 | 17.1 | −1.2 | 2.3 | 4.0 |
| 6C | 250 | 250 | — | 16.5 | 15.2 | 13.5 | −0.5 | 2.3 | 4.1 |
| 6D | 167 | — | 333 | 17.7 | 17.1 | 16.5 | 0.5 | 5.0 | 10.4 |
| 6E | 250 | — | 250 | 17.4 | 17.3 | 16.5 | 0.3 | 3.9 | 7.5 |
| 6F | 1000 | — | — | 18.0 | 17.6 | 16.8 | 4.5 | 9.6 | 16.9 |
| 6G | 333 | 667 | — | 19.4 | 18.9 | 18.5 | 1.0 | 4.4 | 5.9 |
| 6H | 500 | 500 | — | 19.2 | 18.3 | 17.7 | 0.1 | 1.9 | 3.3 |
| 6I | 333 | — | 667 | 18.2 | 18.1 | 17.7 | 0.8 | 4.2 | 8.2 |
| 6J | 500 | — | 500 | 18.2 | 17.9 | 17.5 | 0.0 | 5.8 | 10.7 |
| 6K | | | | 16.2 | 14.7 | 13.5 | −0.9 | 0.3 | 2.4 |

Discussion

While the present invention has been directed to just a few stabilized polymer compositions which are primarily polyolefins, there is no need to limit it to such. In fact, any of the polymers known in the art, such as polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Additionally included would be mixtures of different polymers, such as polyphenylene ether/styrenic resin blends, polyvinylchloride/ABS or other impact modified polymers, methacrylonitrile containing ABS, and polyester/ABS or polyester plus some other impact modifier may also be used. Such polymers are available commercially or may be made by means well known in the art. However, the phosphite/hindered phenol antioxidant blends of the present invention are particularly useful in thermoplastic polymers, such as polyolefins, polycarbonates, polyesters, polyphenylene ethers and styrenic polymers, due to the extreme temperatures at which the thermoplastic polymers are often processed and/or used.

Polymers of monoolefins and diolefins, for example would include polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EM) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene-propylene copolymers, LDPE/EVA, LDPE/EAA, LLDPE/EVA and LLDPE/EM.

Thermoplastic polymers may also include styrenic polymers, such as polystyrene, poly-(p-methylstyrene), poly-(-methylstyrene), copolymers of styrene or -methylstyrene with dienes or acrylic derivatives, such as, for example, styrene/butadiene, styrene/acrylonitrile, styrene/alkyl methacrylate, styrene/maleic anhydride, styrene/budadiene/ethyl acrylate, styrene/acrylonitrile/ methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or -methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, such as acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic an hydride tercopolymer, vinyl chloride-stryene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene with contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly-[2,2,4-(4-hydroxyphenyl)-propane] terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

The resulting stabilized polymer compositions of the invention may optionally also contain various conventional additives, such as the following:

(1) Antioxidants (1.1) Alkylated monophenols, for example:
2,6-di-t-butyl-4-methylphenol,
2-t-butyl-4,6-dimethylphenol, 2,6-di-t-butyl-4-ethylphenol, 2,6-di-t-butyl-4-n-butylphenol,
2,6-di-t-butyl-4-butylphenol, 2,6-di-cyclopentyl-4-methylphenol, 2-(-methylcyclohexyl)-4,6-dimethylphenol, 2,6-di-octadecyl-4-methylphenol,
2,4,6-tri-cyclohexylphenol, and 2,6-di-t-butyl-4-methoxymethylphenol.

(1.2) Alkylated hydroquinones, for example, 2,6-di-t-butyl-4-methoxyphenol, 2,5-di-t-butyl-hydroquinone, 2,5-di-t-amyl-hydroquinone, and 2,6-diphenyl-4-octadecyloxyphenol.

(1.3) Hydroxylated thiodiphenyl ethers, for example, 2,2-thio-bis-(6-t-butyl-4-methylphenol), 2,2-thio-bis-(4-octylphenol), 4,4-thio-bis-(6-t-butyl-3-methylphenol), and 4,4-thio-bis-(6-t-butyl-2-methylphenol).

(1.4) Alkylidene-bisphenols, for example, 2,2-methylene-bis-(6-t-butyl-4-methylphenol), 2,2-methylene-bis-(6-t-butyl-4-ethylphenol), 2,2-methylene-bis-[4-methyl-6-(alpha-methylcyclohexyl)phenol], 2,2-methylene-bis-(4-methyl-6-cyclohexylphenol), 2,2-methylene-bis-(6-nonyl-4-methylphenol), 2,2-methylene-bis-[6-(-methylbenzyl)-4-nonylphenol], 2,2-methylene-bis-[6-(,dimethylbenzyl-4-nonylphenol], 2,2-methylene-bis-(4,6-di-t-butylphenol), 2,2-ethylidene-bis-(4,6-di-t-butylphenol), 4,4-methylene-bis-(6-t-butyl-2-methylphenol), 1,1-bis-(5-t-butyl-4-hydroxy-2-methylphenyl)butane, 2, 6-di-(3-t-butyl-5-methyl-2-hydroxybenzyl)-4-methyl phenol, 1,1,3-tris-(5-t-butyl-4-hydroxy-2-methylphenyl)butane, 1,1-bis-(5-t-butyl-4-hydroxy-2-methylphenyl)-3-dodecylmercaptobutane, ethylenglycol-bis-[3,3-bis-(3-t-butyl-4-hydroxy-phenyl)-butyrate], di-(3-t-butyl-4-hydroxy-5-methylphenyl)-dicyclopentadiene, and di-[2-(3-t-butyl-2-hydroxy-5-methyl-benzyl)-6-t-butyl-4-methylphenyl]terephthalate.

(1.5) Benzyl compounds, for example, 1,3,5-tris-(3,5-di-t-butyl-4-hydroxybenzyl )-2,4,6-trimethylbenzene, bis(3,5- di-t-butyl-4-hydroxybenzyl)sulfide, isooctyl-3,5-di-t-butyl-4-hydroxybenzyl-mercapto-acetate, bis-(4-t-butyl-3-hydroxy-2,6-dimethylbenzyl)dithiolterephthalate, 1,3,5-tris-(3,5-di-t-butyl-4-hydroxybenzyl)isocyanurate, 1,3,5-tris(4-t-butyl-3-hydroxy-2,6-dimethylbenzyl)isocyanurate, dioctadecyl-3,5-di-t-butyl-4-hydroxybenzyl-phosphonate, calcium salt of monoethyl 3,5-di-t-butyl-4-hydroxybenzylphosphonate, and 1,3,5-tris-1,3,5-dicyclohexyl-4-hydroxybenzyl)isocyanurate.

(1.6) Acylaminophenots, for example, 4-hydroxy-lauric acid anilide, 4-hydroxy-stearic acid anilide, 2,4-bis-octylmercapto-6-(3,5-t-butyl-4-hydroxy-anilino)-s-triazine, and octyl-N-(3,5-di-t-butyl-4-hydroxyphenyl)-carbamate.

(1.7) Esters of -(3,5-di-t-butyl-4-hydroxyphenyl)-propionic acid with monohydric or polyhydric alcohols, for example, methanol, diethyleneglycol, octadecanol, triethyleneglycol, 1,6-hexanediol, pentaerythritol, neopentylglycol, tris-hydroxyethyl isocyanurate, thiodiethyleneglycol, and dihydroxyethyl oxalic acid diamide.

(1.8) Esters of -(5-t-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentyglycol, tris-hydroxyethyl isocyanurate, thiodiethyleneglycol, and di-hydroxyethyl oxalic acid diamide.

(1.9) Esters of -(5-t-butyl-4-hydroxy-3-methylphenyl) propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl)isocyanurate, thiodiethylene glycol, and N,N-bis(hydroxyethyl)oxalic acid diamide.

(1.10) Amides of -(3,5-di-t-butyl-4-hydroxyphenyl)-propionic acid, for example, N,N -di-(3,5-di-t-butyl-4-hydroxyphenylpropionyl)-hexamethylendiamine, N,N -di-(3,5-di-t-butyl-4-hydroxyphenylpropionyl)-trimethylendiamine, and N,N -di-(3,5-di-t-butyl-4-hydroxyphenylpropionyl)-hydrazine.

(2) UV Absorbers and Light Stabilizers (2.1) 2-(2-Hydroxyphenyl)-benzotriazoles, for example, the 5-methyl-,3,5-di-t-butyl-, 5-t-butyl-, 5-(1,1,3,3-tetramethylbutyl)-, 5-chloro-3-, 5-di-t-butyl-, 5-chloro-3-t-butyl-5-methyl-, 3-sec-butyl-5-t-butyl-, 4-octoxy, 3,5-di-t-amyl-, and 3, 5-bis-(,-dimethylbenzyl)-derivatives.

(2.2) 2-Hydroxy-benzophenones, for example, the 4-hydroxy-, 4-methoxy-, 4-octoxy-, 4-decyloxy-, 4-dodecyloxy-, 4-benzyloxy-, 4,2,4-trihydroxy- and 2-hydroxy-4,4-dimethoxy- derivatives.

(2.3) Esters of substituted and unsubstituted benzoic acids, for example, phenyl salicylate, 4-t-butyl-phenylsalicilate, octylphenyl salicylate, dibenzoylresorcinol, bis-(4-t-butylbenzoyl)-resorcinol, benzoylresorcinol, 2,4-di-t-butyl-phenyl-3,5-di-t-butyl-4-hydroxybenzoate and hexadecyl-3,5-di-t-butyl-4-hydroxybenzoate.

(2.4) Actylates, for example, -cyano-, -diphenylacrylic acid ethyl ester or isooctyl ester, -carbomethoxy-cinnamic acid methyl ester, -cyano-methyl-p-methoxy-cinnamic acid methyl ester or butyl ester, -carbomethoxy-p-methoxy-cinnamic acid methyl ester, and N-( -carbomethoxy-cyano-vinyl) -2-methyl-indoline.

(2.5) Nickel compounds, for example, nickel complexes of 2,2-thio-bis-[4-(1,1,3,3-tetramethylbutyl)-phenol], such as the 1:1 or 1:2 complex, optionally with additional ligands such as n-butylamine, triethanolamine or N-cyclohexyl-diethanolamine, nickel dibutyidithiocarbamate, nickel salts of 4-hydroxy-3,5-di-t-butylbenzylphosphonic acid monoalkyl esters, such as of the methyl, ethyl or butyl ester, nickel complexes of ketoximes such as of 2-hydroxy-4-methyl-pentyl undecyl ketoxime, and nickel complexes of 1-phenyl-4-lauroyl-5-hydroxy-pyrazol, optionally with additional ligands.

(2.6) Sterically hindered amines, for example bis-(2,2,6,6-tetramethylpiperidyl)-sebacate, bis-(1,2,2,6,6-pentamethylpiperidyl)-sebacate, n-butyl-3,5-di-t-butyl-4-hydroxybenzyl malonic acid, bis-(1,2,2,6,6-pentamethylpiperidyl)ester, condensation product of 1-hydroxyethyl-2,2,6,6-tetramethyl-4-hydroxy-piperidine and succinic acid, condensation product of N,N'-(2,2,6,6-tetramethylpiperidyl)-hexamethylendiamine and 4-t-octylamino-2,6-dichloro-1,3,5-s-triazine, tris-(2,2,6,6-tetramethylpiperidyl)-nitrilotriacetate, tetrakis-(2,2,6,6-tetramethyl-4-piperidyl)-1,2,3,4-butane-tetracarbonic acid, 1,1-(1,2-ethanediyl)-bis-(3,3,5,5-tetramethylpiperazinone). Such amines include hydroxylamines derived from hindered amines, such as di-(1-hydroxy-2,2,6,6-tetramethylpiperidin-4-yl)sebacate; 1-hydroxy-2,2,6,6-tetramethyl-4-benzoxypiperidine; 1-hydroxy-2,2,6,6-tetramethyl-4(3,5-di-t-butyl-4-hydroxyhydrocinnamoyloxy)piperidine; and N-(1-hydroxy-2,2,6,6-tetramethylpiperidin-4-yl)- -caprolactam.

(2.7) Oxalic acid diamides, for example, 4,4-di-octyloxy-oxanilide, 2,2-di-octyloxy-5,5-di-t-butyl-oxanilide, 2,2-di-dodecyloxy-5,5-di-t-butyl-oxanilide, 2-ethoxy-2-ethyl-oxanilide, N,N -bis(3-dimethylaminopropyl)-oxalamide, 2-ethoxy-5-t-butyl-2-ethyloxanilide and its mixture with 2-ethoxy-2-ethyl-5,4-di-t-butyloxanilide and mixtures of o-methoxy and p-methoxy as well as of o-ethoxy and p-ethoxy disubstituted oxanilides.

(3) Metal deactivators, for example, N,N -diphenyloxalic acid diamide, N-salicylal-N -salicyloylhydrazine, N,N -bis-salicyloylhydrazine, N,N -bis-(3,5-di-t-butyl-4-hydroxyphenylpropionyl)-hydrazine, salicyloylamino-1,2,4-triazole, bis-benzyliden-oxalic acid dihydrazide.

(4) Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-t-butylphenyl)phosphite, diisodecyl pentaeythritol diphosphite, bis(2,4-di-t-butylphenyl)pentaerythritol diphosphite, tristearyl sorbitol triphosphite, and tetrakis(2,4-di-t-butylphenyl) 4,4-biphenylene diphosphonite.

(5) Peroxide scavengers, for example esters of -thiodipropionic acid, for example the lauryl, stearyl, myristyl or tridecyl esters, mercaptobenzimidazole or the zinc salt of 2-mercaptobenzimidazole, zinc-dibutyl-dithiocarbamate, dioctadecyldisulfide, pentaerythritol-tetrakis( -dodecylmercapto)-propionate.

(6) Polyamide stabilizers, for example copper salts in combination with iodides and/or phosphorus compounds and salts of divalent manganese.

(7) Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, barium stearate, magnesium stearate, sodium ricinoleate, potassium palmitate, antimony pyrocatecholate and zinc pyrocatecholate.

(8) Lactones, for example, 5,7-di-t-butyl-3-phenyl-3H-benzofuran-2-one; 5,7-di-cumyl-3-phenyl-3H-benzofuran-2-one; nonyl-3-phenyl-3H-benzofuran-2-one; dinonyl-3-phenyl-3H-benzofuran-2-one; 5-t-butyl-3-phenyl-3H-benzofuran-2-one; 5-cumyl-3-phenyl-3H-benzofuran-2- one; and octyl-3-phenyl-3H-benzofuran-2-one, and other 3-arylbenzofuran-2-ones.

(9) Nucleating agents, for example, 4-t-butyl-benzoic acid, adipic acid, diphenylacetic acid.

(10) Fillers and reinforcing agents, for example, calcium carbonate, silicates, glass fibers, asbestos, talc, kaolin, mica, barium sulfate, metal oxides and hydroxides, carbon black, graphite.

(11) Aminoxy propanoate derivatives such as methyl-3-[N,N-dibenzylaminoxy]propanoate; ethyl-3-[N,N-dibenzylaminoxy]propanoate; 1,6-hexamethylene-bis[3-(N,N-dibenzylaminoxy)propanoate]; methyl-[2-(methyl)-3(N,N-dibenzylaminoxy)propanoate]; octadecyl-3-[N,N-dibenzyl-aminoxy]propanoic acid; tetrakis[(N,N-dibenzylaminoxy)ethyl carbonyl oxymethyl]methane; octadecyl-3-[N, N-diethylaminoxy]propanoate; 3-[N,N-dibenzylaminoxy]propanoic acid potassium salt; and 1,6-hexamethylene bis[3-(N-allyl-N-dodecyl aminoxy) propanoate].

(12) Other additives, for example, plasticizers, lubricants, emulsifiers, pigments, optical brighteners, flame-proofing agents, anti-static agents, blowing agents and thiosynergists such as dilaurylthiodipropionate or distearylthiodipropionate.

Hindered phenolic antioxidants may also be present in the polymer composition. Use of bis-aralkylphenyl pentaerythritol diphosphites of the present invention may result in enhanced polymer protection by reducing the formation of color resulting from the presence of the phenols. Such phenolic antioxidants include in addition to those specifically mentioned previously, n-octadecyl-3,5-di-t-butyl-4-hydroxyhydrocinnamate, neopentaneterayl tetrakis-(3,5-di-t-butyl-4-hydroxyl-hydrocinnamate), di-n-octadecyl-3,5-di-t-butyl-4-hydroxybenzyl-phosphonate, 1,3,5-tris(3,5-di-t-butyl-4-hydroxybenzyl-)isocyanurate, thiodiethylene-bis(3,5-di-t-butyl-4-hydroxyhydrocinnamate), 1,3,5-trimethyl-2,4,6-tris(3,5-di-t-butyl-4-hydroxybenzyl)benzene, 3,6-dioxaoctamethylene bis(3-methyl-5-t-butyl-4-hydroxyhydrocinnamate), 2,6-di-t-butyl-p-cresol, 2,2-ethylidene-bis(4,6-di-t-butylphenol), 1,3,5-tris-(2,6-di-methyl-4-t-butyl-3-hydroxybenzyl)isocyanurate, 1,1,3-tris-(2-methyl-4-hydroxy-5-t-butylphenyl)butane, 1,3,5-tris[2-(3,5-di-t-butyl-4-hydroxyhydrocinnamoloxy)-ethyl]-isocyanurate, 3,5-di-(3,5-di-t-butyl-4-hydroxybenzyl)-mesitol, hexamethylene-bis(3,5-di-t-butyl-4-hydroxyhydrocinnamate), 1-(3,5-di-t-butyl-4-hydroxyanilino)-3,5-di(octylthio)-s-triazine, N,N-hexamethylene-bis(3,5-di-t-butyl-4-hydroxyhydrocinnamamide), calcium bis(ethyl-3,5-di-t-butyl-4-hydroxybenzylphosphonate), ethylene bis[3,3-di(3-t-butyl-4-hydroxyphenyl)butyrate], octyl 3,5-di-t-butyl-4-hydroxybenzylmercaptoacetate, bis(3,5-di-t-butyl-4-hydroxyhydrocinnamoyl)hydrazide, and N,N -bis-[2-(3,5-t-butyl-4-hydroxyhydroxocinnamoyloxy)-ethyl]-oxamide, and preferably neopentanetetrayltetrakis(3,5-di-t-butyl-4-hydroxyhydrocinnamate), n-octadecyl-3,5-di-t-butyl-4-hydroxyhydrocinnamate, 1,3,5-trimethyl-2,4,6-tris(3,5-di-t-butyl-4-hydroxy-benzyl)benzene, 1,3,5-tris-(3,5-di-t-butyl-4-hydroxybenzyl)isocyanurate, 2,6-di-t-butyl-p-cresol or 2,2-ethylidene-bis(4,6-di-t-butylphenol).

Other additives, such as oxazapholidines, may additionally or alternatively be present. Likewise, the instant compounds prevent color formation when hindered amine light stabilizers are present, such hindered amines including bis(1,2,2,6,6-pentamethyl-4-piperidyl)-2-n-butyl-2-(3,5-di-t-butyl-4-hydroxy-benzyl) malonate; bis(2,2,6,6-tetramethyl-4-piperidyl) sebacate; dimethylsuccinate polymer with 4-hydroxy-2,2,6,6-tetramethyl-1-piperidinethanol; and polymers of 2,4-dichloro-6-octylamino-s-triazine with N -(2,2,6,6-tetramethyl-4-piperidyl)hexamethylene diamine.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

It is claimed:

1. A composition comprising:
    a polyolefin selected from the group consisting of polyethylene and polypropylene;
    bis-(2,4-dicumylphenyl) pentaerythritol diphosphite;
    at least one additional phosphite selected from the group consisting of tris-(2,4-di-t-butylphenyl)phosphite, bis-(2,4-di-t-butylphenyl)pentaerythritol diphosphite, and 2-butyl-2-ethyl-1,3-propanediol 2,4,6-tri-t-butylphenol phosphite, wherein the weight ratio of said bis-(2,4-dicumylphenyl) pentaerythritol diphosphite to said at least one additional phosphite is in a range of from about 10:1 to about 1:10; and
    tetrakis [methylene(3,5-di-t-butyl-4-hydroxyhydrocinnamate)]methane, wherein the weight of said bis-(2,4-dicumylphenyl) pentaerythritol diphosphite to said at least one additional phosphite is in a range of from about 10:1 to about 1:10; and the ratio of said total phosphite weight to the weight of said tetrakis [methylene(3,5-di-t-butyl-4-hydroxyhydrocinnamate)] methane is from about 2:1 to about 1:1.

2. A composition comprising:
    at least two phosphites defining a total phosphite weight, comprising:
        50–90% by total phosphite weight of bis-(2,4-dicumylphenyl) pentaerythritol diphosphite;
        a balance by total phosphite weight of at least one additional phosphite selected from the group consisting of tris-(2,4-di-t-butylphenyl) phosphite, bis-(2,4-di-t-butylphenyl) pentaerythritol diphosphite, and 2-butyl-2-ethyl-1,3-propanediol 2,4,6-tri-t-butylphenol phosphite; and
    at least one hindered phenol antioxidant:
    and wherein the weight ratio of said bis-(2,4-dicumylphenyl) pentaerythritol diphosphite to said at least one additional phosphite is in a range of from 10:1 to 1:10.

3. The composition of claim 2, wherein said at least one hindered phenol antioxidant is selected from the group consisting of 2,6-di-t-butyl-4-methylphenol, tetrakis [methylene(3,5-di-t-butyl-4-hydroxyhydrocinnamate, tris (3,5-di-t-butyl-4-hydroxybenzyl)-1,3,5-triazine-2,4,6 (1H, 3H, 5H)-trione, and a-tocopherol.

4. The composition of claim 2, wherein said at least one hindered phenol antioxidant is tetrakis [methylene(3,5-di-t-butyl hydroxyhydrocinnamate)]methane.

5. The composition of claim 2, wherein the weight of said bis-(2,4-dicumylphenyl) pentaerythritol diphosphite and the weight of said at least one additional phosphite is the total phosphite weight, and the ratio of said total phosphite weight to the weight of said at least one hindered phenol antioxidant is from about 2:1 to about 1:1.

6. The composition of claim 5, wherein said at least one additional phosphite is selected from the group consisting of tris-(2,4-di-t-butylphenyl) phosphite, and bis-(2,4-di-t-butylphenyl) pentaerythritol diphosphite.

7. The composition of claim 5, wherein said at least one additional phosphite is bis-(2,4-di-t-butylphenyl) pentaerythritol diphosphite.

8. The composition of claim 3, wherein said at least one additional phosphite is selected from the group consisting of tris-(2,4-di-t-butylphenyl) phosphite, and bis-(2,4-di-t-butylphenyl) pentaerythritol diphosphite.

9. The composition of claim 4, wherein said at least one additional phosphite is selected from the group consisting of tris-(2,4,-di-t-butylphenyl) phosphite, and bis-(2,4-di-t-butylphenyl) pentaerythritol diphosphite.

10. A composition comprising:
   at least two phosphites defining a total phosphite weight, comprising:
      50–90% by total phosphite weight of bis-(2,4-dicumylphenyl) pentaerythritol diphosphite;
      a balance by total phosphite weight of at least one additional phosphite; and
   at least one hindered phenol antioxidant.

11. The composition of claim 10, wherein said at least one additional phosphite is selected from the group consisting of tris-(2,4-di-t-butylphenyl) phosphite, distearyl pentaerythritol diphosphite, trisnonylphenyl phosphite, phenyl diisodecyl phosphite, diphenyl isodecyl phosphite, triphenyl phosphite, trilauryl phosphite, alkyl ($C_{12}$–$C_{15}$) bisphenol A phosphite, alkyl ($C_{10}$) bisphenol A phosphite, bis-(2,4-di-t-butylphenyl) pentaerythritol diphosphite, 2-butyl-2-ethyl-1,3-propanediol 2,4,6-tri-t-butylphenol phosphite, bis-(2,6-di-t-butyl-4-methylphenyl) pentaerythritol diphosphite, bis-(2,4-di-t-butyl-6-methylphenyl) ethyl phosphite and 2,2',2"-nitrilotriethanol tris[3,3',5,5'-tetra-tert-butyl-1,1'-biphenyl-2,2'-diyl)-phosphite.

12. The composition of claim 10, wherein said at least one hindered phenol antioxidant is selected from the group consisting of 2,6-di-t-butyl-4-methylphenol, tetrakis [methylene(3,5-di-t-butyl-4-hydroxyhydrocinnamate)] methane, tris (3,5-di-t-butyl-4-hydroxybenzyl)-1,3,5-triazine-2,4,6(1H, 3H, 5H)-trione, and a-tocopherol.

13. The composition of claim 11, wherein said at least one hindered phenol antioxidant is tetrakis [methylene(3,5-di-t-butyl-4-hydroxyhydrocinnamate)]methane.

14. The composition of claim 12, wherein said at least one hindered phenol antioxidant is tetrakis [methylene(3,5-di-t-butyl-4-hydroxyhydrocinnamate)]methane.

15. The composition of claim 10, wherein the weight ratio of said bis-(2,4-dicumylphenyl) pentaerythritol diphosphite to said at least one additional phosphite is in a range of from about 10:1 to about 1:10.

16. The composition of claim 15, wherein the weight of said bis-(2,4-dicumylphenyl) pentaerythritol diphosphite and the weight of said at least one additional phosphite is the total phosphite weight, and the ratio of said total phosphite weight to the weight of said at least one hindered phenol antioxidant is from about 2:1 to about 1:1.

17. The composition of claim 16, wherein said at least one additional phosphite is selected from the group consisting of tris-(2,4-di-t-butylphenyl) phosphite, and bis-(2,4-di-t-butylphenyl) pentaerythritol diphosphite.

18. The composition of claim 17, wherein said at least one additional phosphite is bis-(2,4-di-t-butylphenyl) pentaerythritol diphosphite.

19. The composition of claim 2, wherein said at least one additional phosphite is selected from the group consisting of tris-(2,4-di-t-butylphenyl) phosphite, and bis-(2,4-di-t-butylphenyl)pentaerythritol diphosphite.

20. The composition of claim 15, wherein said at least one additional phosphite is selected from the group consisting of tris-(2,4,-di-t-butylphenyl) phosphite, and bis-(2,4-di-t-butylphenyl)pentaerythritol diphosphite.

21. The composition of claim 10 which further comprises a polymer.

22. The composition of claim 21 wherein the polymer is selected from the group consisting of polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers and blends and mixtures thereof.

* * * * *

UNITED STATES PATENT AND TRADEMARK OFFICE
CERTIFICATE OF CORRECTION

PATENT NO.       : 6,770,693 B1
APPLICATION NO.  : 09/962698
DATED            : August 3, 2004
INVENTOR(S)      : Daryl Stein et al.

It is certified that error appears in the above-identified patent and that said Letters Patent is hereby corrected as shown below:

On The Title Page Item (73) Assignee should read --Dover Chemical Corporation, Dover, OH--.

Signed and Sealed this

Twenty-ninth Day of May, 2007

JON W. DUDAS
*Director of the United States Patent and Trademark Office*